United States Patent
Usami et al.

(12) 
(10) Patent No.: US 6,984,434 B2
(45) Date of Patent: Jan. 10, 2006

(54) RECORDABLE DIGITAL VIDEO DISC

(75) Inventors: Yoshihisa Usami, Odawara (JP);
Michihiro Shibata, Odawara (JP);
Noboru Komori, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/526,127

(22) Filed: Mar. 15, 2000

(65) Prior Publication Data
US 2003/0129351 A1 Jul. 10, 2003

(30) Foreign Application Priority Data
Mar. 15, 1999 (JP) .................................. 11-068588

(51) Int. Cl.
*B32B 3/02* (2006.01)
*G11B 3/70* (2006.01)
*G11B 7/26* (2006.01)

(52) U.S. Cl. .................... 428/64.4; 428/64.1; 428/64.2; 428/64.8; 428/64.9; 369/288; 369/277; 369/272.1

(58) Field of Classification Search ............... 428/64.4, 428/64.1, 64.2, 64.8, 64.9; 369/288, 277, 369/272.1
See application file for complete search history.

(56) References Cited

U.S. PATENT DOCUMENTS
5,952,073 A * 9/1999 Hurditch et al. ........... 428/64.1

FOREIGN PATENT DOCUMENTS
EP 0 747 895 A2 12/1996

* cited by examiner

*Primary Examiner*—Rena Dye
*Assistant Examiner*—Lawrence Ferguson
(74) *Attorney, Agent, or Firm*—Sughrue Mion, PLLC

(57) ABSTRACT

A recordable digital video disc preferably employable for information recording method using a laser beam having a wavelength of 600–700 nm, composed of a transparent disc substrate provided with a spiral pregroove, a recording dye layer placed in the pregroove, and a light-reflecting layer, arranged in order, wherein the recording dye layer has a thickness in the range of 40% to 90% of a thickness corresponding to an optical path which gives the first minimum reflectance, the optical path giving the first minimum reflectance being determined from a reflectance curve which is prepared using recordable digital video discs composed of the same disc substrate, the same recording dye layer having varying thickness, and the same light-reflecting layer.

20 Claims, 1 Drawing Sheet

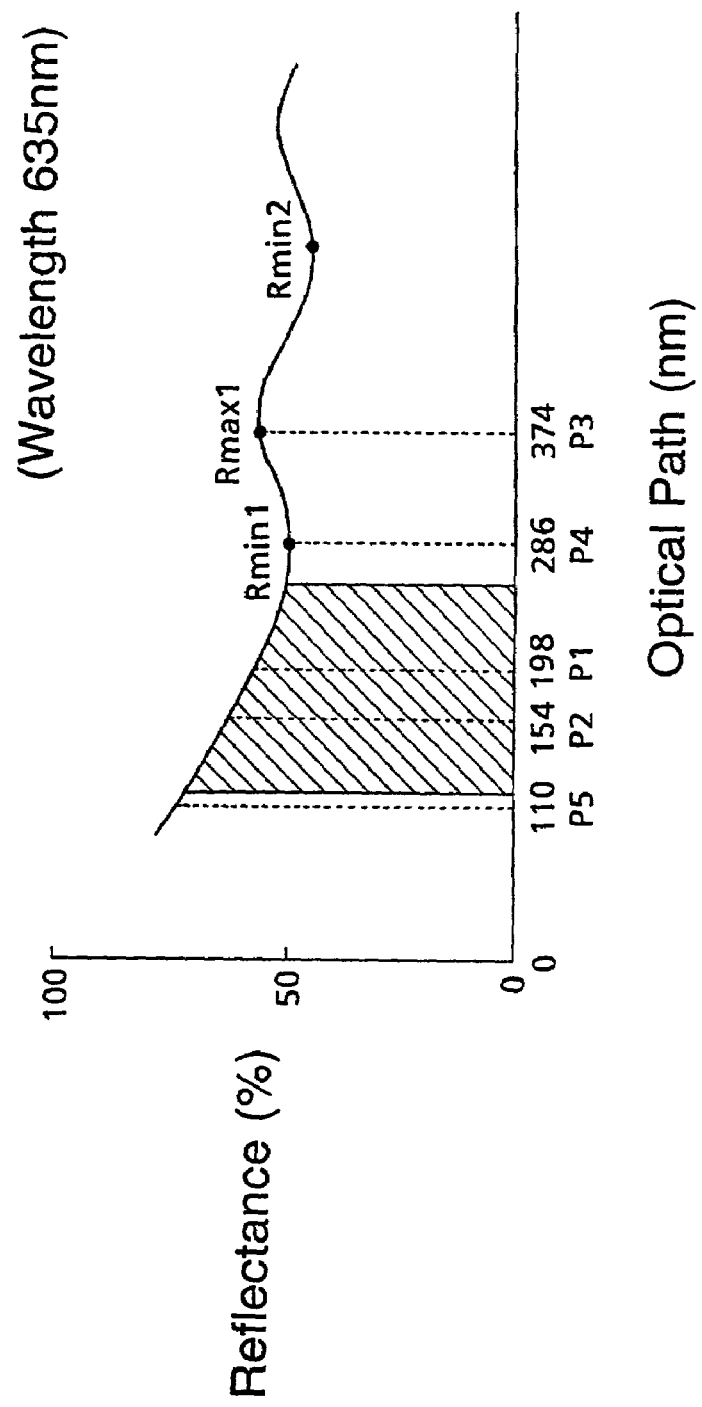
FIGURE

RECORDABLE DIGITAL VIDEO DISC

FIELD OF THE INVENTION

This invention relates to a recordable digital video disc (i.e., optical information recording medium of DVD-R type).

BACKGROUND OF THE INVENTION

An optical information recording medium on which information can be only once recorded by means of a laser beam (i.e., an optical disc of write-once type) is known as a recordable compact disc (CD-R), and is widely used in practice. The optical disc of CD-R type generally has a multi-layered structure typically comprising a disc-shaped transparent substrate (support), a recording layer comprising an organic dye (often referred to as "recording dye layer"), a light-reflecting layer comprising a metal (hereinafter, often referred to as simply "reflecting layer"), and a protective layer made of resin over-laid in order.

Large recording capacity is often needed in recent days, but an optical disc of CD-R type does not always have fully satisfactory large capacity. Therefore, an optical disc having satisfactory large recording capacity has been desired and proposed. For example, a recordable DVD (i.e., recordable digital video disc, DVD-R), which information can be recorded on and read out from by means of a laser beam having a shorter wavelength than that for CD-R, was proposed. The optical disc of DVD-R type is formed by laminating two composites having a layered structure. Each of the layered composites comprises a transparent disc substrate provided with a guide groove (i.e., pregroove) for tracking of the laser beam, a recording layer comprising an organic dye, a light-reflecting layer, and a protective layer arranged in order. The layered composites are combined with an adhesive so that the recording layers would be placed inside. The pre-groove on the substrate of DVD-R has a width of 0.74 to 0.8 µm, which is less than a half of the width of the pregroove on a substrate of CD-R. Otherwise, the optical disc of DVD-R type is formed by combining a protective disc plate and the layered composites comprising a substrate, a recording layer, a light-reflecting layer and a protective layer arranged in order.

For writing (i.e., recording) and reading (i.e., reproducing) the information, a DVD-R is irradiated with a laser beam of visible wavelength region (generally having a wavelength of 600 to 700 nm). By the irradiation of the laser beam, irradiated area of the recording layer is locally heated to change its physical or chemical characteristics, and pits are formed in the irradiated area of the recording layer. Since the optical characteristics of the formed pits are different from those of the area having been not irradiated, the digital information is optically recorded. The recorded information can be read by reproducing procedure generally comprising the steps of irradiating the recording layer with the laser beam having the same wavelength as that employed in the recording procedure, and detecting the light-reflection difference between the pits and their periphery.

A conventional CD-R preferably has a relatively thick recording layer because it is thought to be effective in ensuring high sensitivity and good modulation with high reflectance.

Japanese Patent Provisional Publication No. 2-232832 proposes that the thickness of the recording dye layer of a recordable optical disc be set within ±10% of a thickness corresponding to an optical path which gives the maximum reflectance. The optical path of a recording dye layer giving the maximum reflectance is determined from a reflectance curve which is prepared using recordable optical discs composed of the same disc substrate, the same recording dye layer having varying thickness, and the same light-reflecting layer. In the publication, it is particularly recommended that the thickness of the recording dye layer be set to give an optical path within ±10% of a thickness corresponding to an optical path which gives the first maximum reflectance, which is detected in the reflectance curve counting from the data on the thinnest recording layer. In working examples, a CD-R has a recording dye layer of 130 nm thick, which gives the optical path corresponding to the first maximum reflectance.

The present inventors have studied on a recordable optical information recording disc of DVD-R type (which suits high-density recording more than a disc of CD-R) and found the following problem. It is known that it is effective in ensuring good modulation with high reflectance to make the recording layer relatively thick. However, the thick recording layer often gives an unsatisfactorily large jitter value. A large jitter value means that pits are not formed faithfully corresponding to the information signals, and accordingly that errors occur in the information reproducing procedure. Therefore, it is required to reduce the jitter value of a DVD-R for ensuring reliable high-density recording.

Accordingly, it is an object of the present invention to provide an optical information recording medium of DVD-R type (i.e., recordable digital video disc) having a relatively high reflectance and giving such a low jitter value that errors hardly occur.

SUMMARY OF THE INVENTION

According to the study of the present invention, it is discovered that a recording dye layer of the recordable digital video disc should have a thickness less than (preferably in the range of 40% to 90% of) a thickness corresponding to an optical path which gives the first minimum reflectance, so that the desired low jitter value can be given, keeping the desired high light reflectance. The optical path giving the first minimum reflectance is determined from a reflectance curve which is prepared using recordable digital video discs composed of the same disc substrate, the same recording dye layer having varying thickness, and the same light-reflecting layer.

Accordingly, the present invention resides in a recordable digital video disc comprising a transparent disc substrate provided with a spiral pregroove, a recording dye layer placed in the pregroove on which information is recorded by irradiation with a laser beam, and a light-reflecting layer, arranged in order, wherein the recording dye layer has a thickness in the range of 40% to 90% of a thickness corresponding to an optical path which gives the first minimum reflectance, the optical path giving the first minimum reflectance being determined from a reflectance curve which is prepared using recordable digital video discs composed of the same disc substrate, the same recording dye layer having varying thickness, and the same light-reflecting layer.

The present invention also resides in a recordable digital video disc comprising a transparent disc substrate provided with a spiral pregroove, a recording dye layer placed in the pregroove on which information is recorded by irradiation with a laser beam, a light-reflecting layer, and a disc substrate, arranged in order, or comprising a pair of a transparent disc substrate provided with a spiral pregroove, a recording dye layer placed in the pregroove on which information is recorded by irradiation with a laser beam, a light-reflecting layer, arranged in order, said recording dye layers being placed between the transparent disc substrates, wherein each of the recording dye layers has a thickness in the range of 40% to 90% of a thickness corresponding to an optical path which gives the first minimum reflectance, the optical path giving the first minimum reflectance being determined from a reflectance curve which is prepared using recordable digital video discs composed of the same disc substrate, the same recording dye layer having varying thickness, and the same light-reflecting layer.

The invention further resides in a method of recording information which comprises irradiating the recordable digital video disc of the invention with a laser beam having a wavelength of 600 to 700 nm.

The preferred embodiments of the invention are described below.

(1) The recording dye layer has a thickness in the range of 40% to 75% (preferably 45% to 70%, more preferably 50% to 70%) of the thickness corresponding to an optical path which gives the first minimum reflectance.

(2) The recording dye layer has a thickness of 55 to 95 nm, preferably 60 to 95 nm, more preferably 65 to 93 nm.

(3) The laser beam employed for recording and/or reproducing the information has a wavelength of 620 to 680 nm, preferably 630 to 660 nm.

(4) The pregroove has a depth of 50 to 250 nm, preferably 80 to 220 nm, more preferably 100 to 200 nm.

(5) The pregroove has a half width of 100 to 450 nm, preferably 150 to 400 nm, more preferably 200 to 350 nm.

(6) The spiral pregroove is provided with a track pitch of 0.2 to 1.0 $\mu$m.

(7) The light-reflecting layer has a protective layer on its surface.

(8) The recording dye layer comprises a carbocyanine dye.

BRIEF DESCRIPTION OF THE DRAWING

The FIGURE shows an example of the reflectance curve (indicating the relation between reflectance and optical path of the recording dye layer) of recordable digital video disc.

DETAILED DESCRIPTION OF THE INVENTION

The recordable digital video disc (often referred to as simply "DVD-R") of the invention comprises a transparent disc substrate provided with a spiral pregroove, a recording dye layer on which information is recorded by irradiation with a laser beam, and a light-reflecting layer overlaid in order.

The recordable digital video disc of the invention is characterized by a recording dye layer in the pregroove whose thickness is such small as that in the range of 40% to 90% of a thickness corresponding to an optical path which gives the first minimum reflectance.

The process for producing the DVD-R of the invention is described below.

The DVD-R of the invention can be produced from the materials which have been conventionally used for producing a CD-R, except for using a substrate provided with a pregroove having a track pitch narrower than that of the CD-R. In the production process, the recording layer is made to have a thickness in the aforementioned specific range. In more detail, the DVD-R can be produced by combining, via an adhesive, two layered composites, each of which comprises a substrate, a recording dye layer, a light-reflecting layer, and if desired a protective layer arranged in order, so that the recording dye layers would be placed inside. Otherwise, the DVD-R of the invention can be also produced by combining, via an adhesive, the aforementioned layered composite and a disc protective plate having almost the same shape as the substrate. A detailed description is given below.

The transparent substrate including the disc protective plate (hereinafter, often referred to as "protective substrate") can be made of any of materials known as those for producing the substrate of the known optical information recording medium. Examples of the materials include glass, polycarbonate, acrylic resins such as polymethyl methacrylate, vinyl chloride resins such as polyvinyl chloride and vinyl chloride copolymer, epoxy resins, amorphous polyolefins, and polyesters. These materials can be employed in combination, if desired. The materials are molded to give a sheet or a rigid plate. Polycarbonate is most preferred from the viewpoints of humidity resistance, dimensional stability, and production cost. A disc substrate having a diameter of 120±3 mm and a thickness of 0.6±0.1 mm or one having a diameter of 80±3 mm and a thickness of 0.6±0.1 mm is generally employed.

The substrate may have an undercoating layer on its surface of the recording layer side, so as to enhance surface smoothness and adhesion and to keep the recording dye layer from deterioration. Examples of the materials for the undercoating layer include polymers such as polymethyl methacrylate, acrylate-methacrylate copolymer, styrene-maleic anhydride copolymer, polyvinyl alcohol, N-methylolacrylamide, styrene-vinyltoluene copolymer, chloro-sulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate, and surface treating agents such as a silane-coupling agent.

The undercoating layer can be formed by applying a coating solution (in which one or more of the above-mentioned materials are dissolved or dispersed) onto the surface of the substrate by the known coating methods such as spin-coat, dip-coat, and extrusion-coat. The undercoating layer generally has a thickness of 0.005 to 20 $\mu$m, preferably 0.01 to 10 $\mu$m.

On the surface of the substrate or on the undercoating layer, a pregroove for tracking or giving address signals is formed. The pregroove is preferably formed directly on the surface of the substrate when the substrate is molded from polymer material by injection or extrusion.

Alternatively, the pregroove can be provided on the surface of the substrate by placing a pregroove layer. The pregroove layer can be produced from a mixture of a monomer (such as monoester, diester, triester and tetraester) of acrylic acid (or its oligomer) and a photopolymerization initiator. The pregroove layer can be produced by the steps of coating a precisely produced stamper with a mixture of the polymerization initiator and a monomer such as the above-mentioned acrylic ester, placing a substrate on the formed layer, and irradiating the formed layer with ultraviolet rays through the stamper or the substrate so as to cure the coated layer as well as to combine the cured layer and the substrate. The substrate to which the cured layer is attached is separated from the stamper, to give the desired substrate equipped with a pregroove layer. The thickness of the pregroove layer is generally in the range of 0.05 to 100 $\mu$m, preferably in the range of 0.1 to 50 $\mu$m.

The pregroove formed on the substrate preferably has a track pitch of 0.3 to 0.9 μm (more preferably 0.4 to 0.8 μm), a depth of 50 to 250 nm (more preferably 80 to 220 nm, further preferably 100 to 200 nm), and a half-width of 100 to 450 nm (more preferably 150 to 400 nm, further preferably 200 to 350 nm). A depth of 150 to 200 nm of the pregroove is preferably adopted because such pregroove can enhance the sensitivity without decreasing the light-reflection on the substrate. The optical disc having that pregroove shows a high sensitivity, and hence is employable even in a recording system using a laser beam of low power. This means that a semiconductor laser of low output power can be employed, and the life of semiconductor laser can be prolonged.

On the substrate provided with the pregroove, the recording dye layer is placed. The dye employed for the recording layer is not particularly restricted, but dyes having high absorption at a wavelength of the laser beam are preferred. Dyes employed for conventional optical information recording media are employable. Examples of the dyes include cyanine dyes, phthalocyanine dyes, imidazoquinoxaline dyes, pyrylium/thiopyrylium dyes, azulenium dyes, squarilium dyes, metal (e.g., Ni, Cr) complex dyes, naphthoquinone dyes, anthraquinone dyes, indophenol dyes, merocyanine dyes, oxonol dyes, naphthoaniline dyes, triphenylmethane dyes, triallylmethane dyes, aminium/diimmonium dyes, and nitroso compounds. Preferred are cyanine dyes, phthalocyanine dyes, azulenium dyes, squarilium dyes, oxonol dyes, and imidazoquinoxaline dyes. More preferred are cyanine dyes (particularly carbocyanine dyes).

The recording dye layer can be formed by the steps of dissolving the dye and, if desired an anti-fading agent and a binder in a solvent to prepare a coating liquid, applying the coating liquid onto the substrate provided with a pregroove to form a dye layer, and then drying the formed dye layer. Examples of the solvents employable for the coating liquid include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexanone; ethers such as tetrahydrofuran, diethyl ether and dioxane; alcohols such as ethanol, n-propanol, isopropanol, n-butanol, and diacetone alcohol; fluorine-containing solvents such as 2,2,3,3-tetrafluoropropanol; and glycol ethers such as ethyleneglycol monomethyl ether, ethyleneglycol monoethyl ether, and propyleneglycol monomethyl ether. These solvents may be employed singly or in combination, in consideration of the solubility of the used compounds in the solvent. The coating liquid can further include auxiliary additives such as an oxidation inhibitor, a UV absorber, a plasticizer, and a lubricant.

Examples of the anti-fading agent include nitroso compounds, metal complexes, diinmmonium salts, and aluminum salts. These examples are described in, for example, Japanese Patent Provisional Publications No. 2-300288, No. 3-224793 and No. 4-146189. In the case that the anti-fading agent is added to the coating liquid, the amount of the agent is in the range of 0.1 to 50 wt. %, preferably 0.5 to 45 wt. %, more preferably 3 to 40 wt. %, further preferably 5 to 25 wt. %, based on the amount of the dye.

Examples of the binders include natural-origin polymers such as gelatin, cellulose derivatives, dextran, rosin, and rubber; hydrocarbon polymer resins such as polyurethane, polyethylene, polypropylene, polystyrene and polyisobutyrene; vinyl polymers such as polyvinyl chloride, polyvinylidene chloride, and vinyl chloride-vinyl acetate copolymer; acrylate polymers such as polymethyl acrylate and polymethyl methacrylate; polyvinyl alcohol, chlorinated polyethylene; epoxy resins; butyral resins, rubber derivatives, and thermosetting resins such as prepolymers of phenol-formaldehyde. The amount of the binder may be in the range of 0.2 to 20 weight parts (preferably 0.5 to 10 weight parts, further preferably 1 to 5 weight parts) based on 100 weight parts of the dye. The concentration of the dye in the coating liquid is generally in the range of 0.01 to 10 wt. %, preferably 0.1 to 5 wt. %.

The coating can be performed by the known methods such as spray coat, spin coat, dip coat, roller coat, blade coat, doctor roller coat and screen print. The recording dye layer can be a single layer or can comprise plural layers.

In the invention, the thickness of the recording dye layer at the pregroove is set in the range of 40% to 90% of a thickness corresponding to the optical path which gives the first minimum reflectance in the reflectance curve which is prepared using the same DVD-R having varying thickness. FIG. 1 shows an example of the reflectance curve indicating the relation between reflectance and optical path of the recording layer of DVD-R. The reflectance curve in FIG. 1 is obtained in the following manner. First, a number of DVD-R having recording layers of various thicknesses are produced. A laser beam of 635 nm is applied to each DVD-R, and the reflectance is measured. The optical path is represented by the product of the light-travelling length in the recording dye layer and the absolute refractive index (which depends on the employed dye) of the recording dye layer. Thus calculated optical paths and the measured reflectances are plotted in a graph on the horizontal and vertical axes, respectively, to obtain a reflectance curve such as that illustrated in FIG. 1.

As shown in FIG. 1, according to increase of the thickness of the recording dye layer in the pregroove (i.e., according to increase of the optical path), the reflectance varies to show plural local minima. The reflectance curve in FIG. 1 has two minima, namely, Rmin1 and Rmin2. Rmin1 is the first minimum reflectance. Accordingly, based on the optical path corresponding to Rmin1, the thickness of the recording dye layer in the pregroove is determined. Since the thickness is set in the range of 40% to 90% of the thickness corresponding to that optical path, the recording dye layer is made so that the thickness in the pregroove would give an optical path in the shadowed area in FIG. 1. The DVD-R having a recording dye layer of that thickness in the pregroove gives satisfactory low jitter and ensures a relatively high reflectance. The thickness of the recording dye layer is the pregroove preferably is in the range of 40% to 75% (more preferably 45% to 70%, further preferably 50% to 70%) of the thickness corresponding to the optical path giving the first minimum reflectance. The thickness of the recording dye layer preferably is in the range of 55 m to 95 nm (more preferably 60 nm to 95 nm, further preferably 65 nm to 93 nm).

It is difficult to generally determine the optical path giving the first minimum reflectance and the relation between the thickness and the optical path in the recording dye layer, because they depend upon various conditions such as characteristics of the substrate and the recording layer, materials for the light-reflecting layer, the thickness of the disc, conditions for producing the disc, and the wavelength of the laser beam for recording or reproduction. However, by preparing a reflection curve using a number of recordable digital video discs having the same composition but differing in thickness of the recording dye layer, a suitable thickness for the recording dye layer can be determined.

On the recording dye layer, the light-reflecting layer is placed so as to enhance the light-reflection in the course of reproduction of information.

The light-reflecting material to be used for the formation of the light-reflecting layer should show a high reflection to the laser light. Examples of the light-reflecting materials include metals and sub-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi. Stainless steel film is also employable. Preferred are Cr, Ni, Pt, Cu, Ag, Au, Al and stainless steel. These materials can be employed singly, in combination, or in the form of alloy.

The light-reflecting layer can be formed on the recording layer by, for example, vacuum deposition, sputtering or ion-plating. The thickness of the light-reflecting layer generally is 10 to 800 nm, preferably 20 to 500 nm, further preferably 50 to 300 nm.

On the light-reflecting layer, a protective layer may be provided so as to protect the recording layer and the light-reflecting layer from chemical deterioration or physical damage. In addition to the light-reflecting layer on the light-reflecting layer, another protective layer can be also placed on the substrate on the surface not having the recording dye layer so as to enhance the scratch resistance and the moisture resistance of the medium. The protective layer can be made of inorganic materials such as SiO, $SiO_2$, $MgF_2$, $SnO_2$, $Si_2N_4$, or organic materials such as thermoplastic resins, thermo-setting resins, and UV curable resins. On the light-reflecting layer and/or the substrate, the protective layer can be formed by laminating a film of plastic material with an adhesive. The inorganic material can be also placed on the light-reflecting layer and/or the substrate by vacuum deposition or sputtering. Otherwise, the organic polymer material layer can be formed by the steps of dissolving the polymer material in an appropriate solvent to prepare a coating solution, applying the coating solution to form a polymer material layer, and then drying the formed polymer material layer to give the protective layer. For example, a UV curable resin is dissolved in a solvent and applied onto the light-reflecting layer and/or the substrate, and then cured by applying ultraviolet rays to the formed resin layer. The protective layer can contain various additives such as an anti-static agent, an oxidation inhibitor and a ultraviolet absorber. The thickness of the protective layer generally is in the range of 0.1 to 100 $\mu$m.

Thus, the above-described process can give a layered composite comprising a substrate, a recording layer, a reflecting layer, and if desired a protective layer. For producing the DVD-R of the invention, two composites are produced and combined via an adhesive so that each recording layer would be placed inside. Thus produced DVD-R has two recording layers. On the other hand, the DVD-R of the invention having a single recording layer can be also produced by combining via an adhesive the composite and a disc protective plate having almost the same shape as the composite so that the recording layer would be placed inside. As the adhesive, the UV curable resins described above for the protective layer and synthetic adhesives can be used. Further, double-faced adhesive tape is also employable. The adhesive layer usually has a thickness of 0.1 to 100 $\mu$m (preferably, 5 to 80 $\mu$m). The DVD-R of the invention in any embodiment preferably has a total thickness of 1.2±0.2 mm.

In consideration of assortment of optical information recording media, it is convenient to write or print on each medium a title or figure representing the recorded information. Therefore, the medium preferably has a surface (opposite to the surface exposed to a laser beam) suitable for the representation. Recently, a printing method employing an ink-jet printer has been generally used. In the case that this printing method is adopted, the surface of the medium should be hydrophilic because an aqueous ink is used in the ink-jet printer. Since the surface of the medium itself generally is hydrophobic, it should be subjected to a surface treatment to form a hydrophilic surface layer so that the aqueous ink may be easily attached and fixed thereon. Japanese Patent Provisional Publication Nos. 7-169700 and 10-162438, for example, disclose an optical information recording medium having a hydrophilic printing surface (hydrophilic surface layer). The hydrophilic surface layer may be provided on the optical information recording medium of the invention. If a hydrophilic resin surface layer is provided as the hydrophilic surface layer, it preferably comprises a UV curable resin (binder) and hydrophilic organic polymer particles (such as protein particles) dispersed therein.

Since a layer (e.g., protective layer) provided under the hydrophilic surface layer is generally transparent, gloss of the reflecting layer can be seen through the layer. In the case that the representation is printed on the surface of the surface layer, the gloss often makes the printed image or the hue of the ink unclear. To solve this problem, it is effective to intercept the gloss. For example, white or colored (organic or inorganic) pigments may be incorporated into the surface layer. Otherwise, an intercepting layer comprising a binder (e.g., UV curable resin) and the pigments dispersed therein may be provided under the surface layer. These can be adopted in the recordable digital video disc of the invention.

For preventing fungus in the hydrophilic surface layer, antiseptics may be incorporated. As the antiseptics, there are no particular restrictions, and those described in Japanese Patent Provisional Publication Nos. 3-73429 and 10-162438 are employable. Typical examples of the antiseptics are usually used in an amount of 0.2 to 2.0 mg based on 1 g of the layer.

The recording/reproducing procedures are carried out, for example, in the following manner.

The DVD-R is made to rotate at a predetermined line rate (1.2 to 1.4 m/sec., in the case of CD format) or a predetermined angular velocity. On the rotating disc, a recording light such as a semiconductor laser beam is applied through the transparent substrate. By the application of the laser beam, the irradiated area of the recording layer is heated to change its physical or chemical characteristics. Thus, pits are formed in the recording dye layer, and thereby the information is recorded. The light source preferably is a semiconductor laser having an oscillation frequency in the range of 600 to 700 nm (visible wavelength region). The preferred beam wavelength is in the range of 620 to 680 nm (more preferably, 630 to 660 nm). The recording light is preferably focused through an optical system having a NA of 0.55 to 0.7. The minimum recording pit length is usually in the range of 0.05 to 0.7 $\mu$m (preferably 0.1 to 0.6 $\mu$m, more preferably 0.2 to 0.4 $\mu$m). For reproducing thus recorded information, a semiconductor laser beam having the same wavelength as that used in recording is applied through the transparent substrate onto the DVD-R rotating at a predetermined line rate, and the reflected light is detected. Using the DVD-R of the invention, the information recording and reproducing procedures can be carried out not only at a normal line rate (in the case of CD format) but also at a more high-speed line rate.

The present invention is further described with the following non-restrictive working examples.

EXAMPLE 1

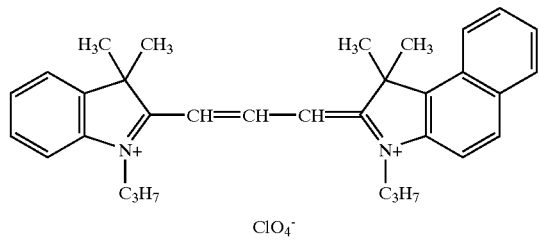

The cyanine dye having the above-illustrated formula was dissolved in 2,2,3,3-tetrafluoro-1-propanol, to prepare a coating liquid for preparing a recording dye layer. Thus prepared coating liquid had the complex index of refraction (n=2.2, k=0.05).

The coating liquid was then coated by spin-coat (rotation was gradually elevated from 300 r.p.m. to 2,000 r.p.m.) on the surface (on which a pregroove was formed) of a polycarbonate substrate (diameter: 120 mm, thickness: 0.6 mm, Panlight AD5503 [trade name], available from Teijin Limited), and dried to give a recording dye layer. The pregroove was beforehand formed spirally on the substrate (track pitch: 0.74 µm, pregroove width: 0.3 µm, depth: 0.15 µm) when the substrate was produced by injection molding.

On thus formed recording dye layer, a light-reflecting layer of Ag (thickness: about 100 nm) was provided by sputtering by means of a DC magnetron sputtering apparatus. A UV curable photopolymer (SD318 [trade name], available from Dainippon Ink & Chemicals, Inc.) was applied by spin-coat (rotation was gradually elevated from 50 r.p.m. to 4,000 r.p.m.) on the light-reflecting layer, and then irradiated with ultraviolet rays for curing to give a protective layer of 8 µm thick. Thus, a layered composite comprising a substrate, a recording dye layer, a light-reflecting layer, and a protecting layer overlaid in order was produced.

Independently, a disc protective substrate (diameter: 120 mm, thickness: 0.6 mm) of polycarbonate was prepared.

The surface of the disc protective substrate and that of the protective layer of the layered composite were independently coated with a slow UV curable resin (SK7000 [trade name], available from Sony Chemical, Co., Ltd.) by means of screen process printing, so that the resin would be in the form of a layer having a thickness of about 10 µm. Each coated surface was exposed to UV light, and immediately the protective substrate and the composition were combined so that the recording layer would be placed inside.

The process described above was repeated except for changing the concentration of the cyanine dye in the coating liquid for recording dye layer, to produce a number of DVD-R discs having recording dye layers of various optical paths. With respect to each disc, the optical path and the reflectance (at 635 nm) were measured and plotted. Thus obtained reflectance curve is shown in FIG. 1.

The curve in FIG. 1 shows the optical path P4 (286 nm) corresponding to the first minimum reflectance, namely, Rmin1. The optical path P1 (198 nm, 69% of P4) was obtained and the thickness giving P1 was determined as 90 nm. According to the results, a DVD-R of the invention comprising a recording layer having a thickness of 90 nm in the pregroove was produced by the aforementioned process in which the concentration of the cyanine dye in the coating liquid for recording layer was set at 0.9% (i.e., 0.9 g of the cyanine dye was dissolved in 100 cc of 2,2,3,3-tetrafluoro-1-propanol).

EXAMPLE 2

According to the curve in FIG. 1, the optical path P2 (154 nm, 54% of P4) was obtained and the thickness giving P2 (286 nm) was determined as 70 nm. A DVD-R of the invention comprising a recording layer having a thickness of 70 nm in the pregroove was produced by the aforementioned process in which the concentration of the cyanine dye in the coating liquid for recording layer was set at 0.7%.

COMPARISON EXAMPLE 1

The curve in FIG. 1 shows the optical path P3 (374 nm) corresponding to the first maximum reflectance, namely, Rmax1. The thickness giving P3 was determined as 170 nm. According to the results, a DVD-R for comparison comprising a recording layer having a thickness of 170 nm in the pregroove was produced by the aforementioned process in which the concentration of the cyanine dye in the coating liquid for recording layer was set at 1.7%.

COMPARISON EXAMPLE 2

The curve in FIG. 1 shows the optical path P4 (286 nm) corresponding to the first minimum reflectance, namely, Rmin1. The thickness giving P4 (286 nm) was determined as 130 nm. According to the results, a DVD-R for comparison comprising a recording layer having a thickness of 130 nm in the pregroove was produced by the aforementioned process in which the concentration of the cyanine dye in the coating liquid for recording layer was set at 1.3%.

COMPARISON EXAMPLE 3

According to the curve in FIG. 1, the optical path P5 (110 nm, 39% of P4) was obtained and the thickness giving P5 was determined as 50 nm. A DVD-R for comparison comprising a recording layer having a thickness of 50 nm in the pregroove was produced by the aforementioned process in which the concentration of the cyanine dye in the coating liquid for recording layer was set at 0.5%.

[Evaluation of Optical Information Recording Media]

(1) On each prepared DVD-R disc, modulation signals of 8 to 16 were recorded using a laser beam of 635 nm (through a pick-up of NA 0.6) in a DDU1000 testing machine (Pulse Tech Co., Ltd.) [line rate: 3.8 m/s, recording power: 9 mW, minimum pit length: 0.4 µm]. The recorded signals were then reproduced by means of the same laser beam at a power of 0.5 mW to measure an optical reflectance and jitter. The reflectance was represented by the ratio (in terms of percentage) obtained by the comparison between the measured intensity of reflected light in groove tracking and the value of a standard sample (whose reflectance had been beforehand known).

(2) With respect to DVD-R of Comparison Example 1, the procedure of (1) was repeated except for changing the line rate into 7.0 m/s [i.e., changing the recording density into a half of that in (1)], to measure an optical reflectance and jitter.

The results are set forth in Table 1.

TABLE 1

|  |  | thickness of recording layer at groove (nm) | reflectance (%) | 3T bottom jitter (nm) |
|---|---|---|---|---|
| Ex. 1 |  | 90 | 60 | 9.1 |
| Ex .2 |  | 70 | 66 | 9.2 |
| C. Ex. 1 | (1) | 170 | 58 | 11.8 |
|  | (2) | 170 | 58 | 10.1 |
| C. Ex. 2 |  | 130 | 50 | 10.9 |
| C. Ex. 3 |  | 50 | 71 | 11.2 |

Remark: The information in Comparison Example 1 (2) was recorded in a half density of Comparison Example 1 (1).

The results shown in Table 1 indicate that the DVD-R according to the invention [i.e., Examples 1 and 2] gives a low jitter value without impairing optical reflectance.

In contrast, high jitter values with low reflectances are given by the disc of Comparison Example 1 and the disc of Comparison Example 2. Further, by comparing Comparison Example 1 (1), it is revealed that high-density recording generally impairs the jitter value. The optical disc of Comparison Example 3 [in which the thickness of the recording dye layer at the pregroove is extremely thin] gives a high reflectance under the influence of the light-reflecting layer, but at the same time it also gives a high jitter value. In addition, it is also confirmed that the disc of Comparison Example 3 shows unsatisfactory sensitivity.

What is claimed is:

1. A recordable digital video disc comprising a transparent disc substrate provided with a spiral pregroove having a depth of 100 to 200 nm and a half width of 100 to 450 nm, a recording dye layer placed in the pregroove on which information is recorded by irradiation with a laser beam, and a light-reflecting layer, arranged in order, wherein the recording dye layer has a thickness in the range of 40% to 90% of a thickness corresponding to an optical path which gives the first minimum reflectance, the optical path giving the first minimum reflectance being determined from a reflectance curve which is prepared using recordable digital video discs composed of the same disc substrate, the same recording dye layer having varying thickness, and the same light-reflecting layer.

2. The recordable digital video disc of claim 1, wherein the recording dye layer has a thickness in the range of 40% to 75% of the thickness corresponding to an optical path which gives the first minimum reflectance.

3. The recordable digital video disc of claim 1, wherein the recording dye layer has a thickness in the range of 45% to 70% of a thickness corresponding to an optical path which gives the first minimum reflectance.

4. The recordable digital video disc of claim 1, wherein the recording dye layer has a thickness in the range of 50% to 70% of a thickness corresponding to an optical path which gives the first minimum reflectance.

5. The recordable digital video disc of claim 1, wherein the recording dye layer has a thickness of 55 to 95 nm.

6. The recordable digital video disc of claim 1, wherein the recording dye layer has a thickness of 60 to 95 nm.

7. The recordable digital video disc of claim 1, wherein the recording dye layer has a thickness of 65 to 93 nm.

8. The recordable digital video disc of claim 1, wherein the pregroove has a depth of 50 to 250 nm.

9. The recordable digital video disc of claim 1, wherein the pregroove has a half-width of 100 to 450 nm.

10. A method of recording information which comprises irradiating a recordable digital video disc of claim 1 with a laser beam having a wavelength of 600 to 700 nm.

11. A recordable digital video disc comprising a transparent disc substrate provided with a spiral pregroove having a depth of 100 to 200 nm and a half width of 100 to 450 nm, a recording dye layer placed in the pregroove on which information is recorded by irradiation with a laser beam, a light-reflecting layer, and a disc substrate, arranged in order, or comprising a pair of transparent disc substrates provided with a spiral pregroove, a recording dye layer placed in the pregroove on which information is recorded by irradiation with a laser beam, and a light-reflecting layer, arranged in order, said recording dye layers being placed between the transparent disc substrates, wherein each of the recording dye layers has a thickness in the range of 40% to 90% of a thickness corresponding to an optical path which gives the first minimum reflectance, the optical path giving the first minimum reflectance being determined from a reflectance curve which is prepared using recordable digital video discs composed of the same disc substrate, the same recording dye layer having varying thickness, and the same light-reflecting layer.

12. The recordable digital video disc of claim 11, wherein each of the recording dye layers has a thickness in the range of 40% to 75% of the thickness corresponding to an optical path which gives the first minimum reflectance.

13. The recordable digital video disc of claim 11, wherein the recording dye layer has a thickness in the range of 45% to 70% of a thickness corresponding to an optical path which gives the first minimum reflectance.

14. The recordable digital video disc of claim 11, wherein the recording dye layer has a thickness in the range of 50% to 70% of a thickness corresponding to an optical path which gives the first minimum reflectance.

15. The recordable digital video disc of claim 11, wherein each of the recording dye layers has a thickness of 55 to 95 nm.

16. The recordable digital video disc of claim 11, wherein the recording dye layer has a thickness of 60 to 95 nm.

17. The recordable digital video disc of claim 11, wherein the recording dye layer has a thickness of 65 to 93 nm.

18. The recordable digital video disc of claim 11, wherein the pregroove has a depth of 50 to 250 nm.

19. The recordable digital video disc of claim 11, wherein the pregroove has a half-width of 100 to 450 nm.

20. A method of recording information which comprises irradiating a recordable digital video disc of claim 11 with a laser beam having a wavelength of 600 to 700 nm.

* * * * *